(12) United States Patent
Suzuki et al.

(10) Patent No.: US 7,293,809 B2
(45) Date of Patent: Nov. 13, 2007

(54) LOAD SENSING DEVICE FOR AUTOMOBILES

(75) Inventors: Kyojiro Suzuki, Nagoya (JP); Hiroyuki Takahashi, Aichi-ken (JP); Ryotaro Kachu, Aichi-ken (JP); Yujiro Miyata, Kariya (JP); Motomi Iyoda, Seto (JP)

(73) Assignees: DENSO CORPORATION, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 73 days.

(21) Appl. No.: 11/075,824

(22) Filed: Mar. 10, 2005

(65) Prior Publication Data

US 2005/0200139 A1    Sep. 15, 2005

(30) Foreign Application Priority Data

Mar. 10, 2004    (JP) .............................. 2004-067603

(51) Int. Cl.
    *B60R 19/48*    (2006.01)
(52) U.S. Cl. ........................................ 293/117; 73/774
(58) Field of Classification Search .................... 293/4, 293/117; 340/436; 701/45; 250/221, 227.14; 73/777, 760, 768, 774, 775
See application file for complete search history.

(56) References Cited

U.S. PATENT DOCUMENTS 6,997,060 B2 *    2/2006    Morikawa ..................... 73/775

FOREIGN PATENT DOCUMENTS

| DE | 44 07 763 A1 | 9/1995 |
| DE | 195 37 383 A1 | 4/1997 |
| EP | 0 952 046 A2 | 4/2005 |
| JP | 2000-264146 | 9/2000 |
| JP | 2005-186677 | 7/2005 |
| WO | WO 2004/033261 | 4/2004 |
| WO | WO 2005/061284 A1 | 7/2005 |

* cited by examiner

*Primary Examiner*—Lori L. Lyjak
(74) *Attorney, Agent, or Firm*—Posz Law Group, PLC

(57) ABSTRACT

A load sensing device comprise an inner member provided at a front part of a vehicle and a load sensor provided at a position before a front of the inner member, in addition to an outer member and a load transfer member. The outer member is provided at the front part of the vehicle so as to be located more frontward than the load sensor so that a space is formed between the outer member and the load sensor. The outer member is in charge of allowing the load sensor to sense, via the outer member, a load applied to a front of the vehicle. The load transfer member, made of a hard material, is disposed adjacently to the load sensor within the space between the outer member and the load sensor. The load sensor is allowed to move along the inner member in the back-and-forth direction of the vehicle.

20 Claims, 3 Drawing Sheets

LOAD SENSING DEVICE FOR AUTOMOBILES

CROSS REFERENCES TO RELATED APPLICATIONS

The present application relates to and incorporates by reference Japanese Patent application No. 2004-67603 filed on Mar. 10, 2004.

BACKGROUND OF THE INVENTION

1. Field of the Invention

The present invention relates to a load-sensing device which is able to sense a load applied to the front of a vehicle.

2. Description of the Related Art

In recent years, it has been pointed out that a pedestrian collided with a vehicle may often be damaged by the portion near the vehicle's hood. Development of a vehicle has thus been proposed that has an airbag provided near the vehicle's hood to protect the pedestrian when the pedestrian is collided with the vehicle (for example, refer to Japanese Patent Laid-open Publication No. 2000-264146).

The airbag as described in the publication No. 2000-264146 and the like needs to be provided with a forward-sensing device provided at the front of the vehicle to sense the collision event. Such a forward sensing device includes a device which uses the infrared sensor and the like to sense the pedestrian approaching the vehicle to predict the collision, and a device which uses the load sensor and the like to sense the pedestrian collided with the vehicle. This specification refers to those of the forward sensing devices that can sense the collision with the load sensor as the load sensing devices.

The load sensor may preferably be provided on the front surface of an inner member such as the bumper reinforcement (or bumper reinforce), which is provided on the front side of the vehicle. An outer member such as the front-bumper cover, which is provided on the vehicle front-end side of the inner member, may preferably cover the vehicle front-side portion of the load sensor. FIG. 4 schematically shows a cross sectional view of such a conventional load-sensing device.

FIG. 4 shows a load sensing device 100 which includes the bumper reinforcement as an inner member 101, which has on its front surface the optical-fiber sensor as a load sensor 102. The front-bumper cover as an outer member 103 covers the vehicle front-side portion of the load sensor 102 and the inner member 101. It is noted that the inner member 101 has predetermined left and right portions that attach to the left and right front ends of a side member 105 of the vehicle frame.

In this load sensing device 100, a pedestrian collided with the vehicle may deform the outer member 103 from the front to back of the vehicle. The outer member 103 may then pressure the load sensor 102 provided on the backside of the outer member 103. This pressure can transmit the load to the load sensor 102 to allow the load sensor 102 to sense the collision. The outer member 103 located over the load sensor 102 may prevent the light load due to such as a pedestrian collided with the parked vehicle from being directly transferred to the load sensor 102, thereby preventing the airbag malfunction and the like.

As shown in FIG. 5, a buffer member 106 is generally provided on the back of outer member 103 to absorb the shock of the collision. In this case, however, the buffer member 106 can transfer the load applied to the outer member 103 to the inner member 101 and may not transfer sufficient load to the load sensor 102. Depending on the arrangement of the outer member 103 and the load sensor 102 and the like, the deformed outer member 103 may contact a portion 107 of the inner member 101 where the load sensor 102 is not provided and prevent the load applied to the vehicle from reliably being transferred to the load sensor 102. These cases may cause a problem that the load sensor 102 cannot reliably detect the load applied to the vehicle.

SUMMARY OF THE INVENTION

The present invention has been made in light of the above-described circumstances, and aims to provide a load sensing device which has the capability of reliably sensing, using a load sensor, the load applied to the vehicle.

To resolve the above-described problem, as one aspect of the present invention, there is provided a load sensing device a load sensing device comprising an inner member, a load sensor, an outer member, and a load transfer member. The inner member is provided at a front part of a vehicle. The load sensor is provided at a position in the vehicle before a front of the inner member. The outer member is provided at the front part of the vehicle so as to be located more frontward than the load sensor so that a space is formed between the outer member and the load sensor, the outer member being in charge of allowing the load sensor to sense, via the outer member, a load applied to a front of the vehicle. The load transfer member made of a hard material and disposed adjacently to the load sensor within the space between the outer member and the load sensor so that the load sensor is allowed to move along the inner member in a back and forth direction of the vehicle.

It is preferred that the inner member is a member extending along a direction approximately crossing the back and forth direction of the vehicle and the load transfer member is disposed to cover the load sensor and secured to the inner member. In this configuration, by way of example, the inner member is a bumper reinforcement (or bumper reinforce) of the vehicle and the outer member is a front-bumper cover of the vehicle.

It is also preferred that the load sensor is attached to either a front surface of the inner member or a back surface of the load transfer member. In this configuration, the inner member is a bumper reinforcement of the vehicle and the outer member is a front-bumper cover of the vehicle.

Preferably in the foregoing basic configuration, a portion of a back surface of the load transfer member that faces the load sensor and a portion of the front surface of the inner member that faces the load sensor are formed to provide a substantially constant distance therebetween.

In the foregoing basic configuration, it is preferred the load transfer member is made of resin. It is also preferred that, on a portion of a back surface of the load transfer member that excludes a portion facing the load sensor, a rib is provided to extend toward the inner member and to have a height shorter than a length of the load sensor in the back and forth direction of the vehicle. Further, it is also preferred that, on a portion of the front surface of the inner member that excludes a portion facing the load sensor, a rib is provided to extend toward the load transfer member and to have a height shorter than a length of the load sensor in the back and forth direction of the vehicle.

The load sensing device according to the present invention provides in a space between the outer member and the load sensor. In the space, the load transfer member is located adjacently to the load sensor so as to cover the load sensor. This load transfer member is movable toward the front surface of the inner member. Thus, a load applied to the front of the vehicle ("forward load") may cause a deformation at the outer member. Responsively, the outer member may press and move the load transfer member toward the front surface of the inner member, thereby causing the load-transfer member and inner member to press the load sensor. In the load sensing device according to the present invention, the forward load can thus be transferred to the load sensor via the load transfer member. The load transfer member provided adjacent to and over the load sensor is able to reliably transfer to the load sensor the forward load applied to the outer member. In addition, the load transfer member is too hard to easily deform, so that the problem is avoidable that the forward sensor results in being transferred to a portion on the inner member at which there is no load sensor.

In the load sensing device according to the present invention, the load sensor can be located in any manner between the front surface of the inner member and the back surface of the load transfer member. The load sensor can, for example, be attached to other members to be provided between the front surface of the inner member and the back surface of the load transfer member. The load sensor is, however, preferably attached to at least one of the front surface of the inner member and the back surface of the load transfer member. This is helpful for transferring the forward load to the load sensor more reliably and providing a simpler structure of the load sensing device which can reduce the manufacturing cost.

The load transfer member is able to transfer the load uniformly to the load sensor, provided that, at least, there is a substantially constant-distance space between the portion of the back surface of the load transfer member that faces the load sensor and the portion of the front surface of the inner member that faces the load sensor. As a result, the load sensor is entitled to detect the forward load more reliably, because a biased application of load to the load sensor can be avoided. For example, there can be avoided such a situation where a large load is transferred to only a portion of the load sensor and no load is transferred to other portions of the load sensor at all.

In addition, it is also possible that the load transfer member is made of resin. In such a structure, the load sensing device can be lightened in its weight.

On the portion of the back surface of the load transfer member that excludes the portion facing the load sensor, a rib can be provided to extend toward the inner member. The rib is shorter in the length than the load sensor in the back and forth direction of the device. The load transfer member pressed and moved by the outer member can stop at the position where the tip of the rib contacts the inner-member surface. Because the length of the rib is shorter than that of the load sensor, the load sensor can be pressed by an amount corresponding to the difference between the rib length and the length of the load sensor in the back and forth direction so that the load sensor is able to sense the forward load in response to the pressed amount.

In addition, in cases where, on the portion of the front surface of the inner member that excludes the portion facing the load sensor, the similar rib is provided to extend toward the load transfer member, the load transfer member can stop at the position where the tip of the rib contacts the surface of the load transfer member. The load sensor is allowed to pressed corresponding to the difference between the rib length and the length of the load sensor in the back and forth direction, with the forward load transferred depending on the difference accordingly.

The above ribs provided on the load transfer member or inner member allow the load sensor to be compressed to a limited degree, and allow the limited forward load to be applied to the load sensor, even when a large-amplitude load is applied to the vehicle in collision events between vehicles, for example. Thus the problems such as load-sensor damages due to an excessive forward load applied to the load sensor can be avoided well.

DETAILED DESCRIPTION OF THE PREFERRED EMBODIMENTS

Figure 1:
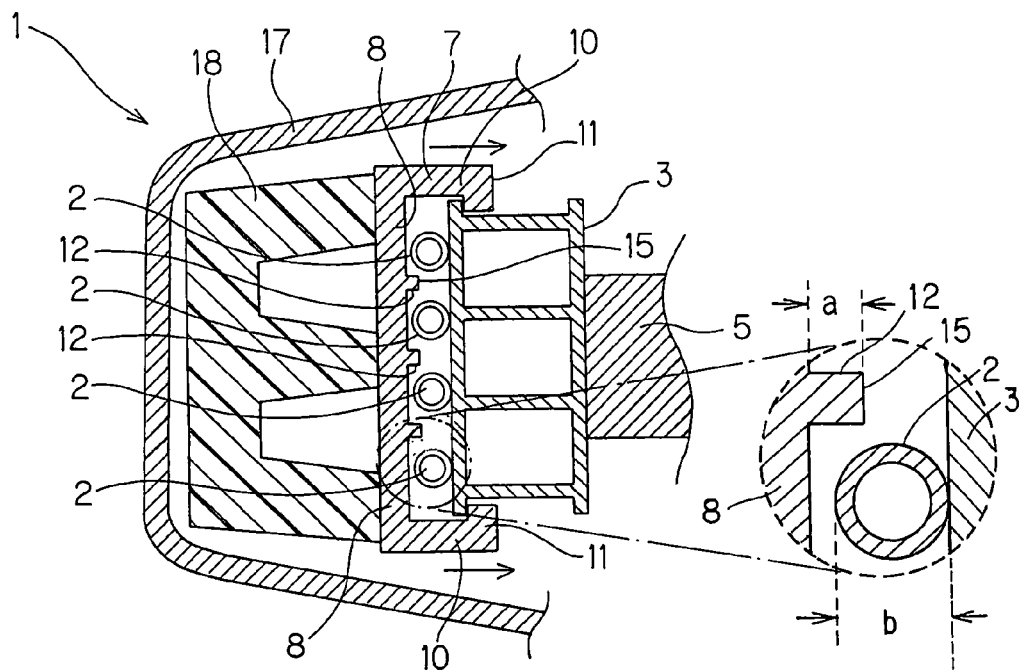
FIG. 1 schematically shows a cross sectional view of a load sensing device employed by a first embodiment according to the present invention.
Figure 2:
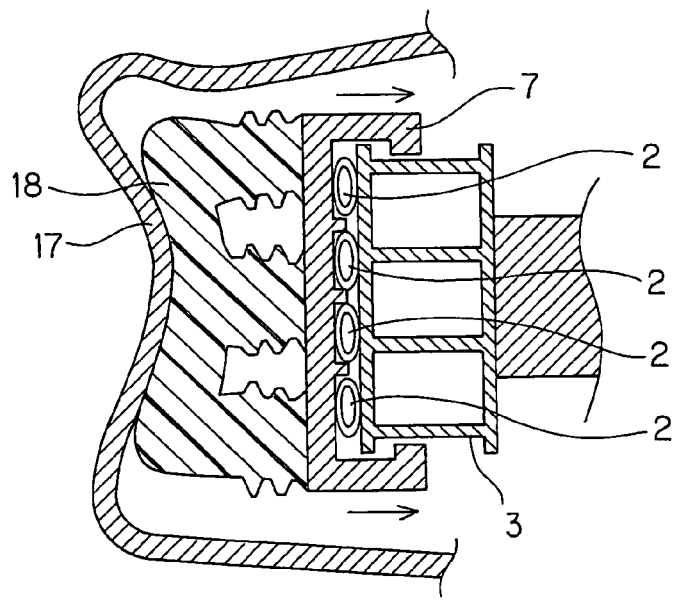
FIG. 2 schematically shows a cross sectional view of the load sensing device according to the first embodiment, in which the load sensing device is under an application of a forward load.

With reference to FIGS. 1 and 2, a load sensing device (or unit) according to the present invention will now be outlined before entering the detailed description of examples of the load sensing device.

As shown in FIGS. 1 and 2, a load sensing device 1 according to the present invention includes an inner member 3, a load sensor 2, an outer member 17, and a load transfer member 7.

The load sensor 2 can be composed of any sensor that can output a signal according to the load, preferably such as the strain gauge and optical-fiber sensor. The strain gauge can output an electrical signal according to the load. The optical-fiber sensor can output an optical signal according to the load. One or more load sensors can be provided. The inner member may include any member that resides on the front side of the vehicle and makes up a portion of the vehicle, such as the above-mentioned bumper reinforcement (or bumper reinforce). The outer member may include any member that is provided at the front end of the vehicle and makes up a portion of that vehicle, such as the front-bumper cover.

The load transfer member 7 resides in a space between the outer member and load sensor at the position adjacent to the load sensor. The load transfer member may include hard materials such as metal and hard resin, and resides in front of and over the load sensor. The load-transfer member is provided movable toward the front surface of the internal member. The load sensor may attach to the back surface of the load-transfer member, which is on the inner-member side of the load-transfer member, or to the front surface of the inner member, which is the load transfer member side of the inner member. In both cases, the application of the forward load may cause the load transfer member and inner member to sandwich and press the load sensor. It is preferable that the load transfer member is attached slidably with respect to the outer member and inner member, and can slide toward the front surface of the inner member. The load transfer member may, however, move toward the front surface of the inner member in other ways.

A returning means may be provided for returning the load transfer member forward that has moved toward the front surface of the inner member, in other words, has moved backward. The returning means preferably includes a biasing means such as a spring fixed on the inner member.

The load-transfer member may include any hard material, and is preferably made of resin material such as PBT, for example.

The forward load detection device for a vehicle according to the present invention may include the above-mentioned buffer member provided in back of the outer member. In this case, the load-transfer member may again be located adjacent to the load sensor, so that the outer member may transfer the forward load through the buffer member to the load transfer member which may in turn transfer the forward load to the load sensor. The load sensor can thus again reliably detect the forward load.

The load transfer member may be shaped in any form that can transfer the forward load to the load sensor. However, at least the portion of the back surface of the load transfer member that faces the load sensor and the portion of the front surface of the inner member that faces the load sensor may preferably be formed to have a substantially constant distance between them. The load applied to the vehicle from the forward direction may move the load transfer member toward the front surface of the inner member to sandwich the load sensor between the load-transfer member and inner member. Depending on the shape of the load transfer member, it may thus not transfer the uniform load to the load sensor. In addition, for a plurality of the load sensors, the load-transfer member may not transfer the load to some of the load sensors. The load transfer member can transfer the uniform load to the load sensor, thereby allowing the load sensor to sense the forward load more reliably, if at least the portion of the back surface of the load-transfer member that faces the load sensor and the portion of the front surface of the inner member that faces the load sensor are formed to have a substantially constant distance between them.

On the portion of the back surface of the load-transfer member that excludes the portion facing the load sensor, a rib is preferably provided extending toward the inner member, which rib is shorter than the length of the load sensor in the back and forth direction. This can prevent the load-sensor damage even when the excess forward-load is applied on the vehicle as described above. Likewise, on the portion of the front surface of the inner member that excludes the portion facing the load sensor, a rib may be provided extending toward the load-transfer member, which rib is shorter than the length of the load sensor in the back and forth direction, thereby preventing the load-sensor damage. The rib may be provided fully or partially along the length where the load sensor is provided. The rib may be provided on the load-transfer member with the load sensor attached to the load-transfer member or to the inner member. The rib may be provided on the inner member with the load sensor attached to the load-transfer member or to the inner member. In each case, the load-sensor damage can be prevented.

The load sensing device according to the present invention is described below with reference to the drawings.

DETAILED EMBODIMENTS

Figure 3:
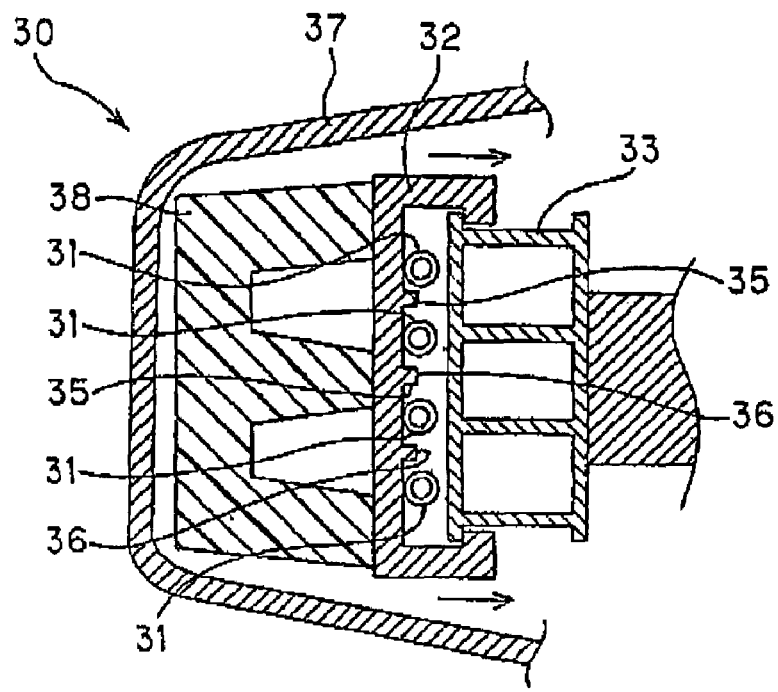
FIG. 3 schematically shows a cross sectional view of a load sensing device employed by a second embodiment according to the present invention.
Figure 4:
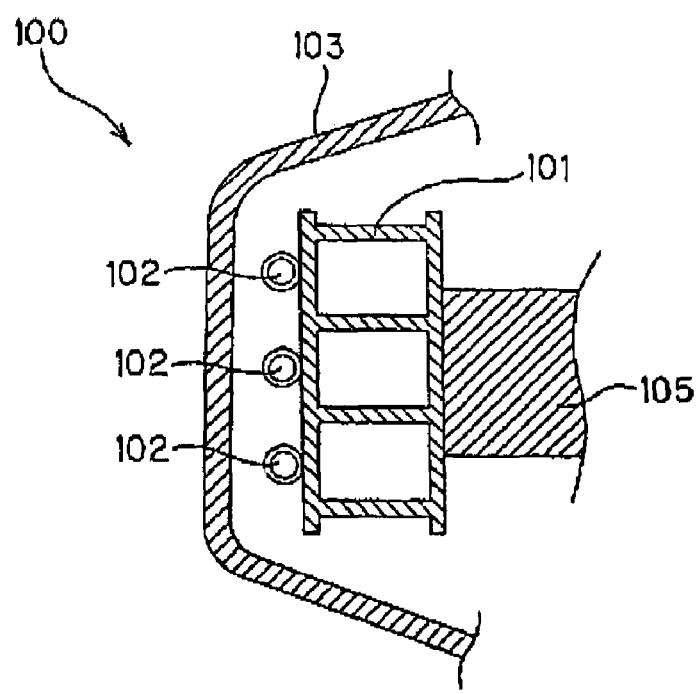
FIG. 4 schematically shows a cross sectional view of a conventional load sensing device.
Figure 5:
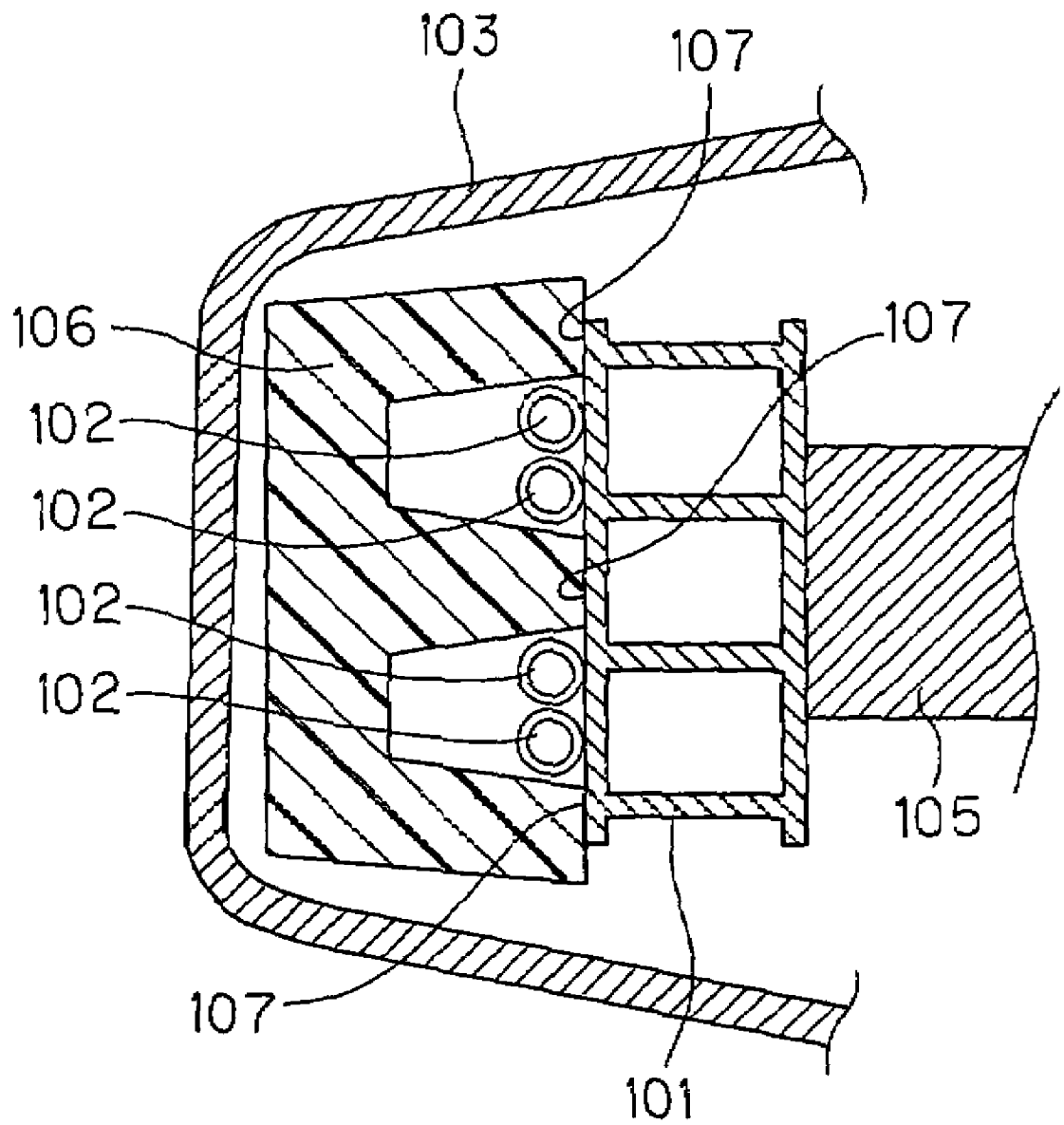
FIG. 5 schematically shows a cross sectional view of a further conventional load sensing device.

Referring to FIGS. 1-3, detailed embodiments of the load sensor mounting device 1 shown in above will now be provided.

First Embodiment

In a first embodiment of the present embodiment, the load sensing device 1 uses an optical-fiber sensor as the load sensor. FIG. 1 schematically shows a cross sectional view of the load sensing device in this embodiment. FIG. 2 schematically shows a cross sectional view of the load sensing device which is under an application of a forward load.

In the load sensing device 1 in this embodiment, the optical-fiber sensor 2 serving as load sensor is secured on the front surface of the bumper reinforcement of the vehicle, the bumper reinforcement serving as an inner member 3 or a first member according to the present invention. The optical-fiber sensor 2 is provided to extend in the lateral direction along the inner member 3, that is, the direction extending from side to side of the inner member 3, and turns back at both the left and right ends to be arranged in the up and down direction. The optical-fiber sensor 2 has one end that connects to a not-shown light-emitting means, and the other end that connects to a not-shown light-receiving means. The inner member 3 has predetermined left and right portions that attach to the left and right front ends of side members 5 of the vehicle frame.

In front of the optical-fiber sensor 2, a load transfer member 7 made of for example PBT resin is provided over the front surface of the load sensor 2 on the inner member 3. The load transfer member 7 includes substantially a flat pressuring portion 8 including a back surface shaped to correspond to the front surface of the inner member 3.

The load transfer member 7 also includes substantially an L-shape leg portion 10 that extends backward from the upper and lower ends of the pressuring portion 8. Each leg portion 10 extends along the inner member 3 toward the back of the inner member 3. Each leg portion 10 has a back end portion 11 that bends to surround the front surface (i.e., front wall portion) of the inner member 3 at a substantially right angle toward the other leg portion 10. The load transfer member 7 catches slidably the upper and lower surfaces of the inner member 3 via the leg portion 10. On the back surface of the pressuring portion 8, a rib 12 extending toward an inner member 3 is provided at the position corresponding to the space between fibers of the optical-fiber sensor 2 arranged in the up and down direction. The rib 12 has a protrusion height "a" shorter than the length "b" of the optical-fiber sensor 2 in the back and forth direction. The rib 12 has a protruding end face 15 that is spaced apart from inner member 3 under no forward load condition.

A front-bumper cover serving as an outer member 17 (corresponding to a second member of the present invention) resides in front of the front surface of the load transfer member 7. The outer member 17 is secured on the inner member 3 to be apart from load transfer member 7. A buffer member 18 made of a soft porous material resides in a space between the outer member 17 and the load transfer member 7.

In the present load detecting device 1, the forward load applied to the vehicle deforms the outer member 17, as shown in FIG. 2. The deformed outer member 17 presses the buffer member 18. The buffer member 18 pressed by the outer member 17 deforms and presses the load transfer member 7. The load transfer member 7 pressed by the buffer member 18 will slide toward the load sensor 2. The slide load transfer member 7 is allowed to contact the optical-fiber sensor 2 to press it. The optical-fiber sensor 2 held by the inner member 3 is therefore sandwiched between the inner member 3 and the load transfer member 7.

The optical-fiber sensor 2 pressed and deformed in this way will interfere with the light passing through the optical-fiber sensor 2. A light-receiving means connected to the optical-fiber sensor 2 is thus able to detect light intensity less than the light intensity radiated into the optical-fiber sensor 2 by a light-emitting means. The difference between the light intensity radiated by the light-emitting means and the light intensity detected by the light-receiving means may be detected as the load applied to the optical-fiber sensor 2. The light-receiving means connects to a not-shown operation control means, and transmits a voltage signal to the operation control means according to the load applied to the optical-fiber sensor 2. After receiving the voltage signal, the operation control means operates immediately expand an airbag provided near the hood in response to the voltage signal strength.

The load sensing device 1 according to the present embodiment is entitled to transfer the forward load applied to the vehicle to the optical-fiber sensor 2 via the load-transfer member 7. The load sensing device 1 in this embodiment can thus reliably transfer the forward load to the optical-fiber sensor 2 to allow the sensor 2 to reliably sense the forward load of the vehicle.

In addition, the rib 12 provided on the load transfer member 7 is able to prevent the optical-fiber sensor from being damaged, even when being subjected to an excessive forward-load application.

Second Embodiment

Referring to FIG. 3, a second embodiment of the present invention will now be described. In the description of the second embodiment, the similar or identical components to those in the first embodiment will be made reference with the same reference numerals as those in the first embodiment.

A load sensing device 30 according to the second embodiment is the same as the device 1 shown in the first embodiment, except that the load sensor is provided to attach to the load transfer member. FIG. 3 schematically shows a cross sectional view of the load sensing device 30 employed by this embodiment.

In the load sensing device 30, an optical-fiber sensor 31 serving as the load sensor is secured on the back surface of a load transfer member 32. The optical-fiber sensor 31 is provided extending in the direction from side to side of the load transfer member 32, and turns back at both the left and right ends to be arranged in the up and down direction. The load sensor 31 has one end that connects to a not-shown light-emitting means, and the other end that connects to a not-shown light-receiving means, in a similar way to that in the first embodiment. On the back surface of the load transfer member 32, a rib 35 extending toward the inner member 33 is provided at a position corresponding to a space between fibers of the load sensor 31 arranged in the up and down direction. The rib 35 has a protrusion height shorter than the length of the optical-fiber sensor 31 in the back and forth direction. The rib 35 has a protruding end face 36 that is spaced apart from the inner member 33 under no forward load condition.

In load detection device 30 according to the present embodiment, the forward load applied to the vehicle will deform an outer member 37, and the deformed outer member 37 is allowed to press a buffer member 38. The buffer member 38 will then be deformed to press the load transfer member 32. The load transfer member 32 pressed by the buffer member 38 is forced to slide toward the inner member 33. The optical-fiber sensor 31 attached to the back surface of load-transfer member 32 is allowed to slide toward the inner member 33 along with the load transfer member 32 to contact the inner member 33. The inner member 33 and load transfer member 32 therefore sandwiches the optical-fiber sensor 31 to press it. This pressure enables the deformed optical-fiber sensor 31 to sense the forward load.

The load sensing device 30 in this embodiment is capable of transferring the forward load applied to the vehicle to the optical-fiber sensor 31 via the load transfer member 32, as in the first embodiment. The optical-fiber sensor 31 can thus reliably sense the forward load.

In addition, the rib 35 provided on the load transfer member 32 can prevent the load-sensor damage under the excess forward load application.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A load sensing device provided between an inner member and an outer member, which are provided at a front part of a vehicle, both the inner member and the outer member forming a space therebetween in a back and forth direction of the vehicle, the outer member receiving a load applied to a front of the vehicle in the back and forth direction, the load sensing device comprising:
   a load sensor provided on the inner member within the space in the back and forth direction;
   a load transfer member disposed in front of the load sensor within the space and disposed to be allowed to move in the back and forth direction of the vehicle; and
   a buffer member provided to reside between the outer member and the load transfer member in the space, the load transfer member being made of a material which is harder than the buffer member.

2. The device according to claim 1, wherein the inner member is a member extending along a direction approximately crossing the back and forth direction of the vehicle and the load transfer member is disposed to cover the load sensor and secured to the inner member.

3. The device according to claim 2, wherein the inner member is a bumper reinforcement of the vehicle and the outer member is a front-bumper cover of the vehicle.

4. The device according to claim 1, wherein the load sensor is attached to either a front surface of the inner member or a back surface of the load transfer member in the back and forth direction.

5. The device according to claim 4, wherein the inner member is a bumper reinforcement of the vehicle and the outer member is a front-bumper cover of the vehicle.

6. The device according to claim 1, wherein a portion of a back surface of the load transfer member that faces the load sensor and a portion of the front surface of the inner member that faces the load sensor are formed to provide a substantially constant distance therebetween.

7. The device according to claim 1, wherein the load transfer member is made of resin.

8. The device according to claim 1, wherein, on a portion of a back surface of the load transfer member that excludes a portion facing the load sensor, a rib is provided to extend toward the inner member and to have a height shorter than a length of the load sensor in the back and forth direction of the vehicle.

9. The device according to claim 1, wherein, on a portion of the front surface of the inner member that excludes a portion facing the load sensor, a rib is provided to extend toward the load transfer member and to have a height shorter than a length of the load sensor in the back and forth direction of the vehicle.

10. A load, sensing device provided between a first member and a second member, which are provided at a front part of a vehicle, both the first member and the second member forming a space therebetween in a back and forth direction of the vehicle, the second member receiving a load applied to a front of the vehicle in the back and forth direction, the load sensing device comprising;
   a load sensor provided on the first member within the space in the back and forth direction;
   a load transfer member disposed in front of the load sensor within the space and disposed to be allowed to move in the back and forth direction; and
   a buffer member provided to reside between the second member and the load transfer member in the space, the load transfer member being made of a material which is harder than the buffer member.

11. The device according to claim 10, wherein the load sensor is placed to be movable along the first member in a back and forth direction of the vehicle.

12. The device according to claim 11, wherein the first member is a member extending along a direction approximately crossing the back and forth direction of the vehicle and the load transfer member is disposed to cover the load sensor and secured to the first member.

13. The device according to claim 12, wherein the inner member is a bumper reinforcement of the vehicle and the outer member is a front-bumper cover of the vehicle.

14. The device according to claim 13, wherein the load sensor is attached to a front surface of the first member.

15. The device according to claim 13, wherein the load sensor is attached to a back surface of the load transfer member.

16. The device according to claim 13, wherein the load transfer member is made of resin.

17. The device according to claim 13, wherein the load sensor is an optical-fiber sensor.

18. The device according to claim 12, wherein:
   the inner member includes a bumper reinforcement of the vehicle;
   the outer member includes a front-bumper cover of the vehicle; and
   the load sensor is an optical fiber having plural fiber portions provided to extend in a direction approximately crossing the back and forth direction on the bumper reinforcement.

19. The device according to claim 1, wherein the load transfer member is disposed so as to be movable along the inner member in the back and forth direction.

20. A load sensing device provided at a front part of a vehicle in a space formed between a first member and a second member, the second member receiving a load applied to a front of the vehicle, the load sensing device comprising:
   a load sensor provided on the first member and extending within the space in a longitudinal direction;
   a load transfer member disposed in front of the load sensor within the space and disposed so as to be capable of moving in the longitudinal direction; and
   a buffer member provided to reside between the second member and the load transfer member in the space, the load transfer member being made of a material which is harder than the buffer member.

* * * * *